(12) United States Patent
Nagaoka et al.

(10) Patent No.: US 7,114,328 B2
(45) Date of Patent: Oct. 3, 2006

(54) CONTROL METHOD OF EXHAUST GAS PURIFYING SYSTEM

(75) Inventors: Daiji Nagaoka, Fujisawa (JP); Masashi Gabe, Fujisawa (JP); Hitoshi Sato, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 339 days.

(21) Appl. No.: 10/648,193

(22) Filed: Aug. 27, 2003

(65) Prior Publication Data

US 2005/0014978 A1  Jan. 20, 2005

(30) Foreign Application Priority Data

Aug. 30, 2002  (JP) .............................. 2002-252293

(51) Int. Cl.
*F01N 3/00* (2006.01)
(52) U.S. Cl. .............................. 60/285; 60/274; 60/295; 60/297
(58) Field of Classification Search .................. 60/274, 60/285, 295, 297, 301
See application file for complete search history.

(56) References Cited

U.S. PATENT DOCUMENTS 5,778,666 A * 7/1998 Cullen et al. .................. 60/274
5,832,722 A * 11/1998 Cullen et al. .................. 60/274
5,974,788 A * 11/1999 Hepburn et al. ............... 60/274
6,173,571 B1 * 1/2001 Kaneko et al. ................ 60/286
6,199,372 B1 * 3/2001 Wakamoto .................... 60/274
6,233,925 B1 * 5/2001 Hirota et al. .................. 60/285
6,644,021 B1 * 11/2003 Okada et al. .................. 60/286

FOREIGN PATENT DOCUMENTS

JP    2000-274279    10/2000

* cited by examiner

*Primary Examiner*—Binh Q. Tran
(74) *Attorney, Agent, or Firm*—Staas & Halsey LLP

(57) ABSTRACT

In an exhaust gas purifying system wherein an NOx occlusion reduction type catalyst (30) including a catalytic metal and an NOx occluding substance is installed in an exhaust passage (3) of an engine (10), a restore processing against the sulfur poisoning of the NOx occlusion reduction type catalyst (30) is executed, by performing a lax rich control for controlling the air/fuel ratio of the exhaust gas to the theoretical air/fuel ratio or slightly lower than the theoretical air/fuel ratio, when the NOx occlusion reduction type catalyst (30) is heated equal or superior to the sulfur purge temperature.

NOx is purified up effectively, by excluding effects of the sulfur poisoning, suppressing the deterioration of fuel-efficiency, by the control method for exhaust gas purifying system.

2 Claims, 8 Drawing Sheets

(a)

(b)

(c)

[Operation control flow of exhaust gas purifying system]

[Operation control flow of Regeneration control operation]

CONTROL METHOD OF EXHAUST GAS PURIFYING SYSTEM

BACKGROUND OF THE INVENTION

The present invention relates to a control method of an exhaust gas purifying system to remove NOx (nitrogen oxides) in an exhaust gas of an internal combustion engine through the reduction using an NOx occlusion reduction type catalyst. More particularly, it relates to a control method of an exhaust gas purifying system to restore the state of the NOx occlusion reduction type catalyst deteriorated through a sulfur poisoning.

Various studies and proposals have been made relating to an NOx catalyst for removing NOx by reducing it from an exhaust gas of an internal combustion engine such as diesel engine, kind of gasoline engines and various combustion equipments.

Among them, there is an exhaust gas purifying system for an internal combustion engine wherein an NOx occlusion reduction type catalyst is arranged in the exhaust passage of an engine, as described in Laid-Open Japanese Patent Publication 2000-274279. In the exhaust gas purifying system, NOx is absorbed in the NOx occlusion reduction type catalyst when the air/fuel ratio of an inflowing exhaust gas is lean. Then, when the NOx absorption capacity gets close to its saturation point, the control for regenerating the catalyst is done. By this control, the oxygen concentration of the inflowing exhaust gas is lowered by setting its air/fuel ratio to the theoretical air/fuel ratio or to rich condition for discharging the absorbed Nox, and the discharged NOx is reduced by using an annexed precious catalytic metal.

This NOx occlusion reduction type catalyst supports an NOx occluding substance (NOx absorbing material) made of an alkaline-earth metal such as Barium (Ba) and a precious catalytic metal such as platinum (Pt) on a catalyst support. Then, under a high oxygen concentration atmosphere, NO in the exhaust gas is oxidized by the catalytic activity of the platinum to change into $NO_2$. This $NO_2$ diffuses in the catalyst with a form of $NO_3-$, and absorbed by the NOx occluding substance with a form of nitrate.

When the air/fuel ratio becomes rich and the oxygen concentration lowers, $NO_3-$ will be discharged from the NOx occluding substance with a form of $NO_2$. This $NO_2$ is reduced to $N_2$, under the catalyst activity of the platinum by reducers such as unburned HC, CO and $H_2$ contained in the exhaust gas. This reduction effect permits to prevent NOx from being discharged in the atmosphere.

However, since a sulfur content contained in the fuel of the diesel engine is accumulated in the NOx occluding substance to stabilize as sulfate, the NOx occlusion reduction type catalyst has a problem of sulfur poisoning that the amount of NOx occlusion reduces.

If the deterioration of NOx occluding substance progresses by the sulfur poisoning, the NOx purifying efficiency declines because the NOx absorbing capacity is lowered, even if the air/fuel ratio of the exhaust gas is in lean state and the oxygen concentration is high. In addition, because the NOx absorbing activity lowers immediately to the proximity of its limit, a frequent regeneration processing by a rich-burn is required. As a result, the fuel efficiency deteriorates.

Consequently, a regeneration processing is required to restore the NOx absorbing capacity of the NOx occluding substance by releasing under the low oxygen concentration atmosphere NOx absorbed under the high oxygen concentration atmosphere through changing over from the lean state to the rich state. In addition, a catalyst deterioration restoring process to remove the sulfur content using sulfur purge is also required at a phase when the deterioration has progressed to some extent by monitoring the progress of the catalyst deterioration caused by sulfur poisoning.

In the sulfur purge, however, it is necessary to raise the catalyst temperature as high as around 600° C. to 700° C. and to keep a reducing atmosphere as well. Therefore, a temperature and a rich state of the exhaust gas is needed for the sulfur purge different from that of the exhaust gas during the regeneration process to restore the NOx absorbing capacity of the NOx occluding substance.

Besides, it is necessary to raise the exhaust gas temperature to 600° C. or more for the sulfur purge. However, a lot of fuel is required to make the catalyst temperature around 600° C. to 700° C. for the sulfur purge by performing the controls such as intake throttling and post-injection to raise the exhaust gas temperature from the low temperature of the lean state of normal operation condition. And the fuel consumption deteriorates. As a result, it is particularly important to make the rich state optimal for the sulfur purge.

BRIEF SUMMARY OF THE INVENTION

The present invention has been devised to resolve the problems mentioned above, and has an object to provide a control method for an exhaust gas purifying system allowing to pulify NOx efficiently, by excluding activity of sulfur poisoning, all the way limiting the deterioration in the mileage, in an exhaust gas purifying system using an NOx occlusion reduction type catalyst for purifying NOx in the exhaust gas.

The control method for the exhaust gas purifying system for achieving the object as mentioned above is a method in which NOx occlusion reduction type catalyst including a catalytic metal and an NOx occluding substance is installed in an exhaust passage of the engine, wherein a recovery process against the sulfur poisoning of the NOx occlusion reduction type catalyst is carried out by performing a lax rich control for controlling the air/fuel ratio of the exhaust gas at the theoretical air/fuel ratio or slightly lower, when said NOx occlusion reduction type catalyst is heated up to more than the sulfur purge temperature.

This catalytic metal can be made of those having the catalytic function to reductive oxidations such as platinum. And, the NOx occluding substance can be made of any one or combination of alkali metals including potassium (K), sodium (Na), lithium (L), cesium (Cs) and so on, alkali alkaline-earth metals including barium (Ba), calcium (Ca), or precious earth metals such as lanthanum (La), yttrium (Y).

In addition, the NOx occlusion reduction type catalyst also can comprise a reducer occluding substance made of zeolite or the like, which occludes HC and CO at low temperature and discharges at high temperature.

Besides, the operation of a rich air/fuel ratio in the exhaust gas does not necessarily mean an operation of rich-burn in the cylinder bore, but it means an operation that a ratio of air quantity and fuel quantity in the exhaust gas flowed into the NOx occlusion reduction type catalyst is near the theoretical air/fuel ratio or the fuel quantity exceeds the fuel quantity of the theoretical air/fuel ratio to be rich-burn.

According to the composition, it is possible to perform the sulfur purge efficiently preventing the temperature from falling, for the air/fuel ratio of the exhaust gas is controlled at the theoretical ratio or slightly lower than the theoretical air/fuel ratio, namely, the excess air factor is controlled at 1.0 or slightly lower than 1.0.

In addition, in the control method for exhaust gas purifying system described above, an optimal environment for the sulfur purge is realized by a lax rich control setting the excess air factor of the exhaust gas to 0.95 to 1.0. In passing, the excess air factor of the exhaust gas in the regeneration control for restoring the NOx occluding capacity is normally at around 0.8 to 0.95 at the catalyst inlet and in the lax rich control, the oxygen concentration is controlled to be higher than in the rich control for regeneration.

According to the control method for exhaust gas purifying system of the composition, the following effects can be brought about.

When the sulfur purge is required, the intake gas is throttled to raise the temperature by the temperature raising control operation. And, when the catalyst temperature reaches the temperature capable of desulphurizing by the temperature raising control operation, the air/fuel ratio of the exhaust gas is controlled at the theoretical air/fuel ratio or slightly lower than the theoretical air/fuel ratio, preferably at 0.95 to 1.0 in terms of excess air factor by the lax rich control operation. Thereby, an efficient sulfur purge operation is available under the optimal low oxygen concentration atmosphere.

DETAILED DESCRIPTION OF THE INVENTION

Figure 1:
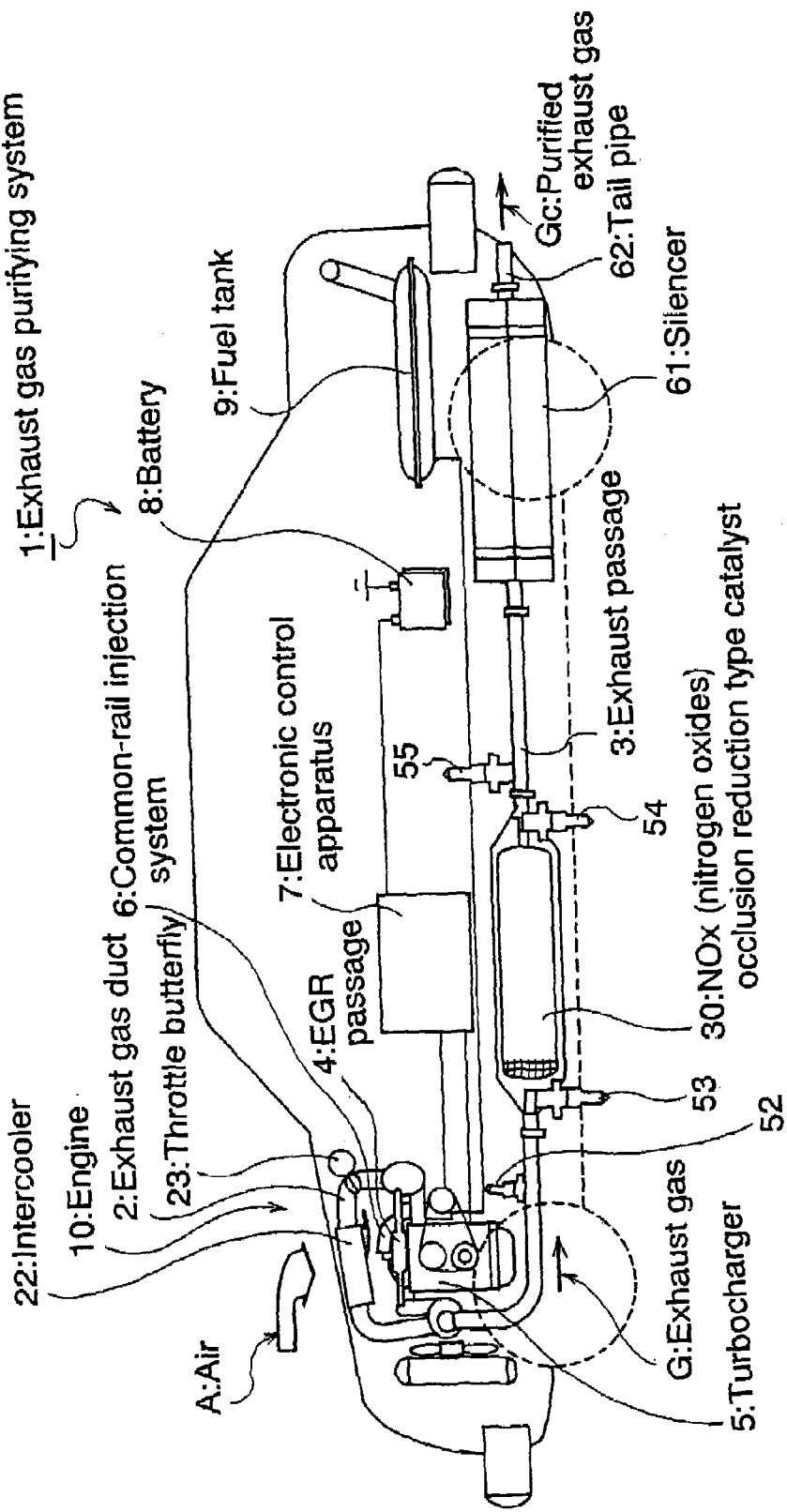
FIG. 1 shows a composition of an exhaust gas purifying system according to an embodiment of the present invention.
Figure 2:
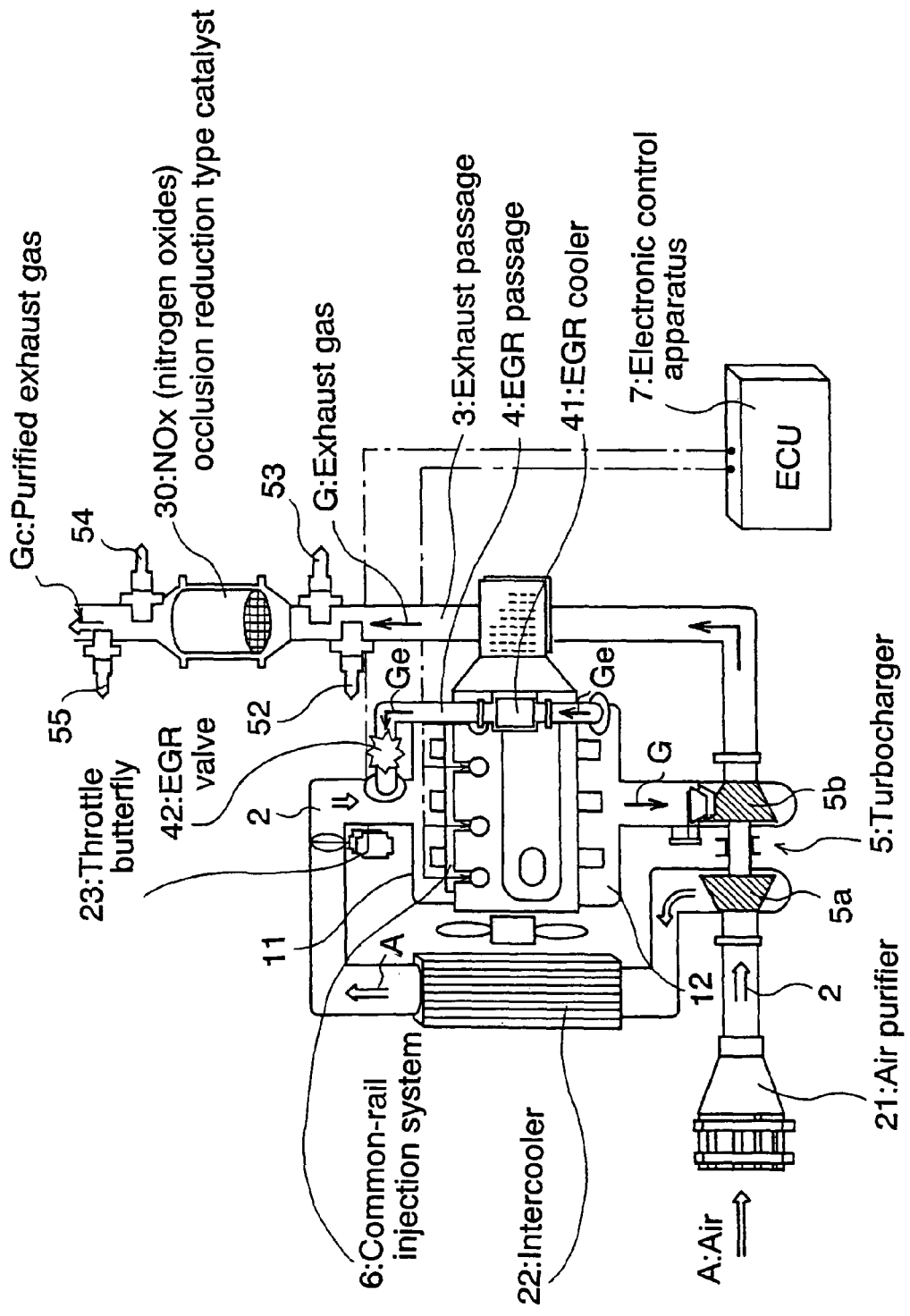
FIG. 2 shows a composition of an engine system portion of the exhaust gas purifying system of FIG. 1.

Hereafter, the control method for exhaust gas purifying system according to the present invention shall be described, referring to drawings.

The exhaust gas purifying system according to the present invention is an exhaust gas purifying system 1 provided with an NOx occlusion reduction type catalyst (or DPF supporting the relevant catalyst) 30. In the exhaust gas purifying system 1, an air purifier 21, a compressor 5a of a turbocharger 5, intercooler 22 and a throttle butterfly (intake throttle valve) 23 are arranged in sequence from the upstream side in an exhaust gas duct 2 of an engine 10. On the other hand, the upstream side exhaust gas temperature sensor 52, a turbine 5b of the turbocharger 5, an upstream side air/fuel ratio sensor (or oxygen concentration sensor) 53, an NOx occlusion reduction type catalyst 30, a downstream side exhaust gas temperature sensor 54, a downstream side air/fuel ratio sensor (or oxygen concentration sensor) 55 and a silencer 61 are arranged in sequence from the upstream side in an exhaust passage 3. Furthermore, an EGR passage 4 provided with an EGR cooler 41 and an EGR valve 42 is connected an exhaust manifold 12 to the intake gas passage 2 on the downstream side of the throttle butterfly 23.

Then, a common-rail injection system 6 which injects a fuel to the engine 10, and an electronic control apparatus (electronic control box) 7 called an ECU (engine control unit) for controlling the whole engine are installed.

Besides, any of variable capacity type turbo (VGS), turbo with waist gate or ordinary turbo may be used as the turbocharger 5. In case of using a variable capacity type turbo (VGS) or a turbo with waist gate, both of the variable nozzle and the waist gate is also controlled by electronic control apparatus 7.

In the exhaust gas purifying system 1, an air A is supercharged by the compressor 5a of the turbocharger 5 after passing through the air purifier 21. Thereafter, the air A passes through the throttle butterfly 23 after cooled by the intercooler 22 to be supplied in the cylinder from the intake manifold 11 of the engine 10. The flow of the intake air is adjusted by the throttle butterfly 23 which is controlled by the electronic control apparatus 7.

On the other hand, after an exhaust gas G is discharged from the exhaust manifold 12 to drive the turbine 5b of the turbocharger 5, it passes through the NOx occlusion reduction type catalyst 30 to be purified into the exhaust gas Gc, and after passing through the silencer 61 (FIG. 1), the exhaust gas Gc is discharged from a tail pipe 62 (FIG. 1).

Then, an EGR gas Ge which is a part of the exhaust gas G, passes through the EGR valve 42 after being cooled by the EGR cooler 41, to enter the 2, and circulates again. And for the EGR gas Ge, ON/OFF and the gas flow are adjusted by the EGR valve 42.

Now, the NOx occlusion reduction type catalyst 30 shall be described.

Figure 3:
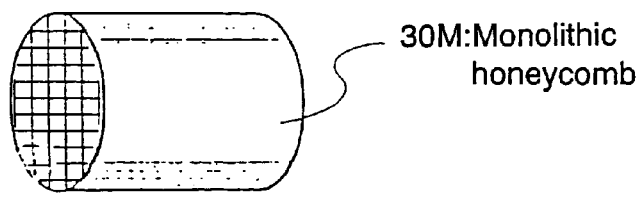
FIG. 3(a) shows a monolithic honeycomb structure of an NOx occlusion reduction type catalyst of an embodiment according to the present invention.
FIG. 3(b) shows a cell structure of FIG. 3(a)
FIG. 3(c) shows a catalyst support structure of FIG. 3(b)
Figure 3:
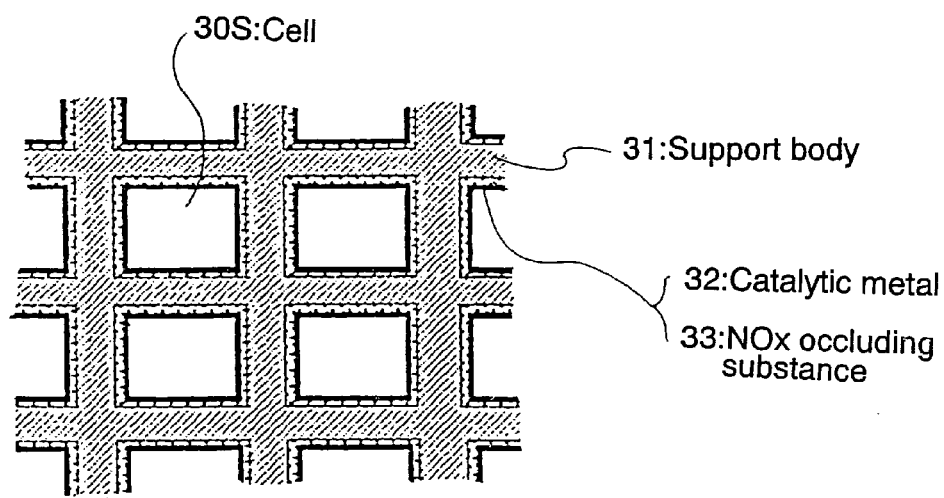
Figure 3:
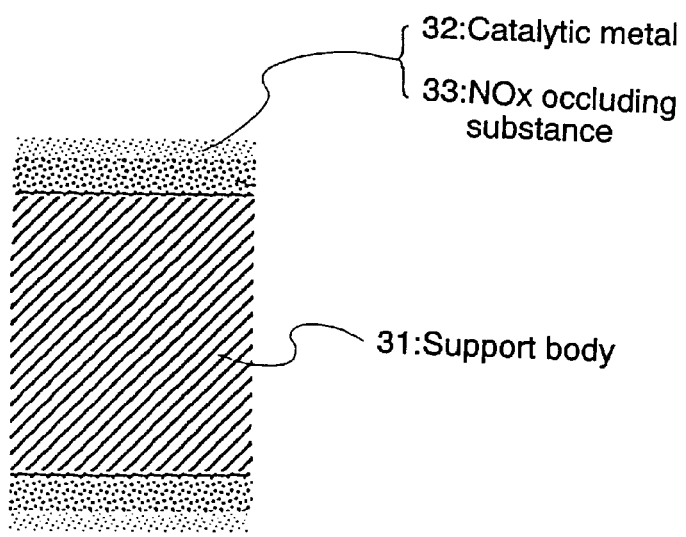

FIG. 3 shows the wall surface structure of the NOx occlusion reduction type catalyst 30. The NOx occlusion reduction type catalyst 30 is made of a monolithic honeycomb 30M shaped by a support body 31 such as γ-alumina. A catalytic metal 32 and an NOx occluding substance 33 are supported on the surface in a cell 30S of this monolithic honeycomb 30M.

This catalytic metal 32 is made of platinum (Pt) and the like, having an oxidation activity in a temperature range higher than the starting temperature of the activity. The starting temperature of the activity for platinum is at about 150° C. to 200° C.

Besides, the NOx occluding substance 33 is made of alkali metals such as potassium (K), sodium (Na), lithium (L), cesium (Cs) and so on, alkali alkaline-earth metals such as barium (Ba), calcium (Ca) and precious earth metals such as lanthanum (La), yttrium (Y). The NOx occlusion reduction type catalyst 33 occludes NOx when the oxygen concentration in the gas is high, and releases NOx when the oxygen concentration in the gas is low.

Figure 4:
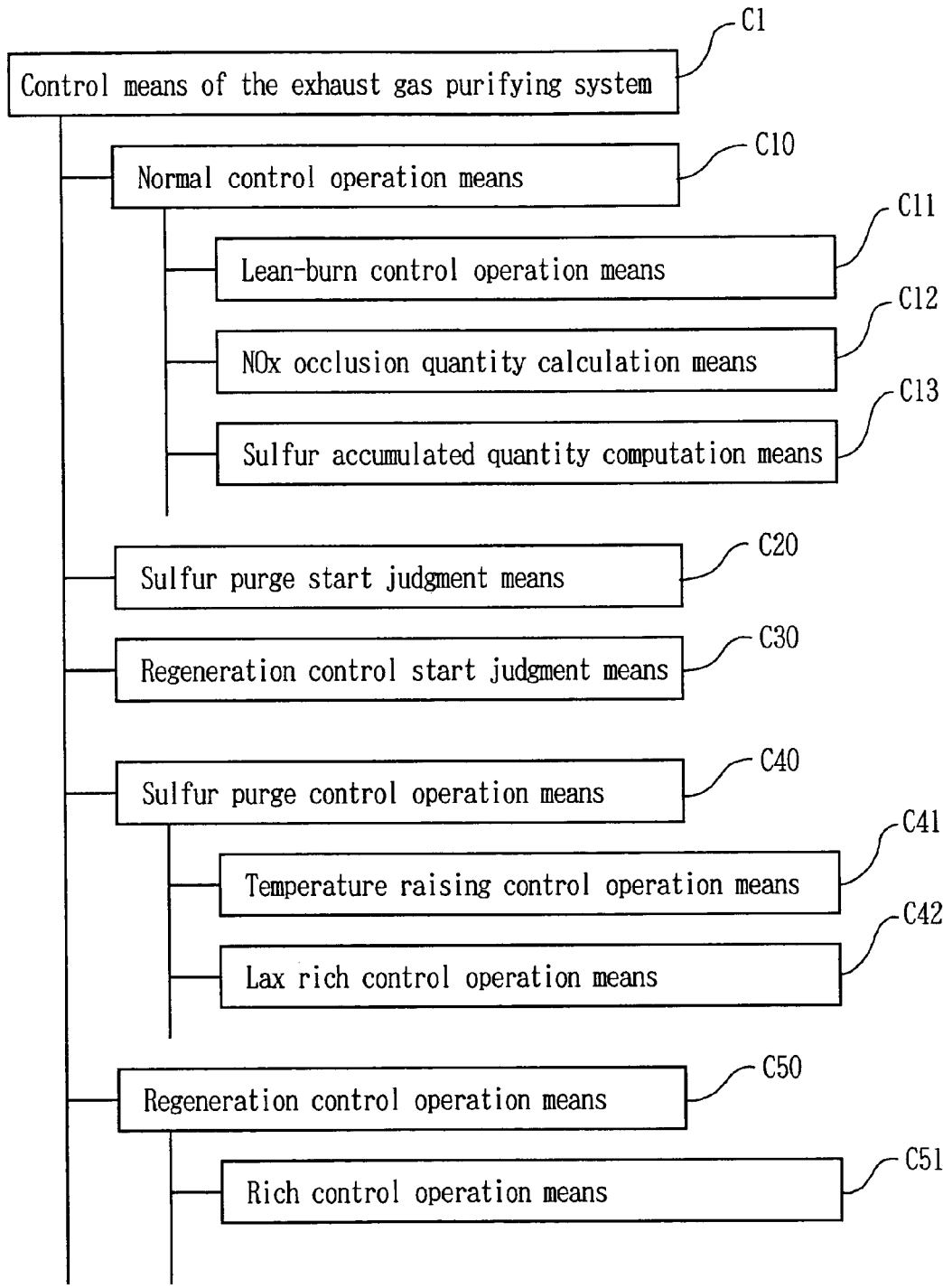
FIG. 4 shows a composition of a control system for exhaust gas purifying system on an embodiment according to the present invention.

The regeneration control method in the exhaust gas purifying system 1 is performed by a control means comprising means as shown in FIG. 4. This control means C1 is composed of a normal control operation means C10, a sulfur purge start judgment means C20, a regeneration control start judgment means C30, a sulfur purge control operation means C40, and a regeneration control operation means C50 and so on.

This normal control operation means C10 is a control means for performing the normal lean-burn operation. The sulfur purge start judgment means C20 is a means for judging whether the sulfur purge operation is performed, and judges to start the sulfur purge operation when the sulfur poisoning reaches the limit. Moreover, the regeneration control start judgment means C30 is a means to judge whether the NOx absorbing capacity of the NOx occlusion reduction type catalyst 30 has saturated enough to start the regeneration control.

Then, the sulfur purge control operation means C40 is a means for purging sulfur from the NOx occluding substance poisoned by sulfur, and is composed of a temperature raising control operation means C41 and a lax rich control operation means C42.

Moreover, the regeneration control operation means C50 is a means for regenerating the catalyst by rich-burn. This regeneration control operation means C50 make the NOx occluding substance 30 discharge NOx by generating an exhaust gas with an excess air factor λ is 0.8 to 0.95 and almost zero of oxygen concentration at the catalyst inlet and at the same time, reduces and purifies the released NOx to restore the NOx absorbing capacity, and regenerates the catalyst.

Figure 5:
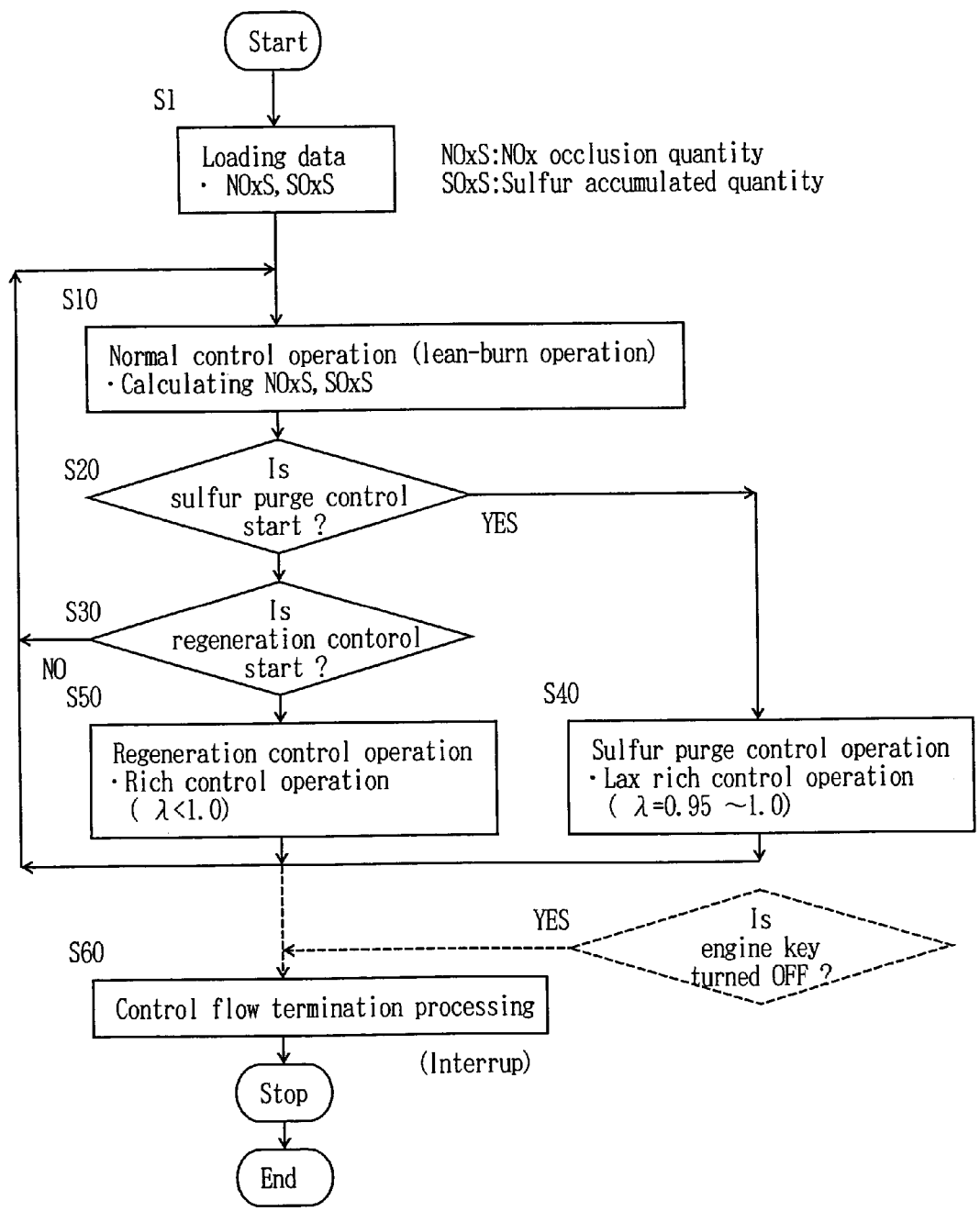
FIG. 5 is a flow chart of an operation control flow showing an exhaust gas purifying method of an embodiment according to the present invention.
Figure 6:
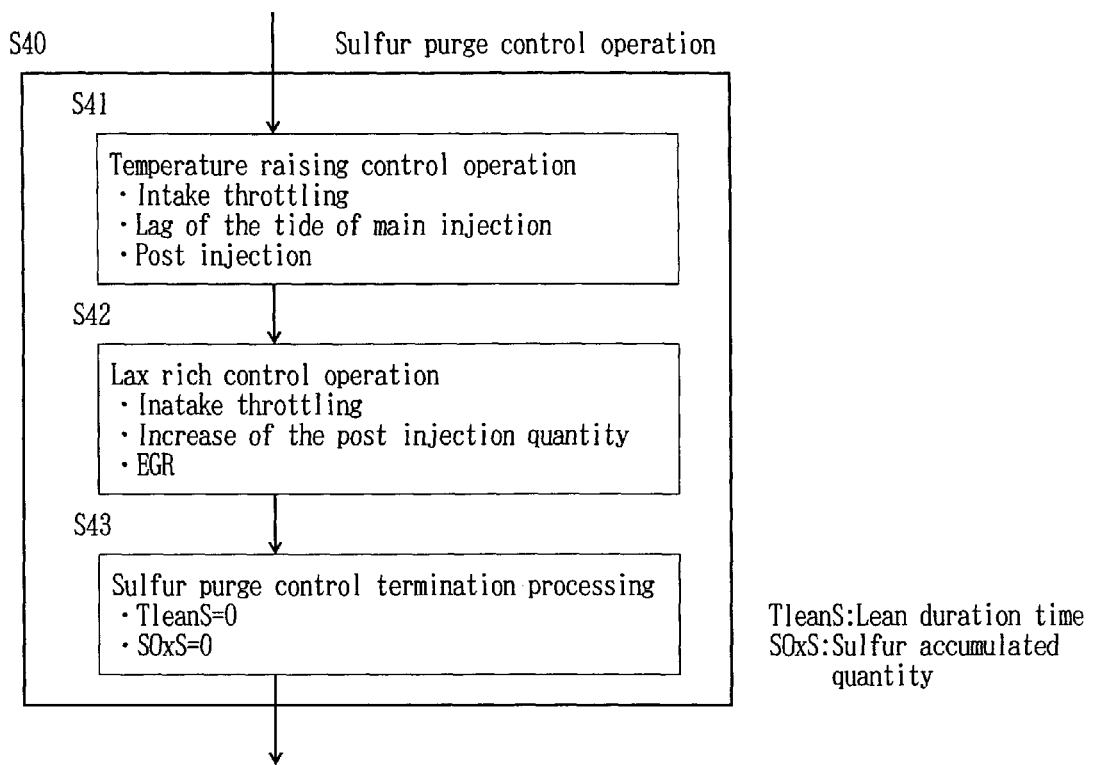
FIG. 6 is a more detailed flow chart of a sulfur purge control operation shown in FIG. 5.
Figure 7:
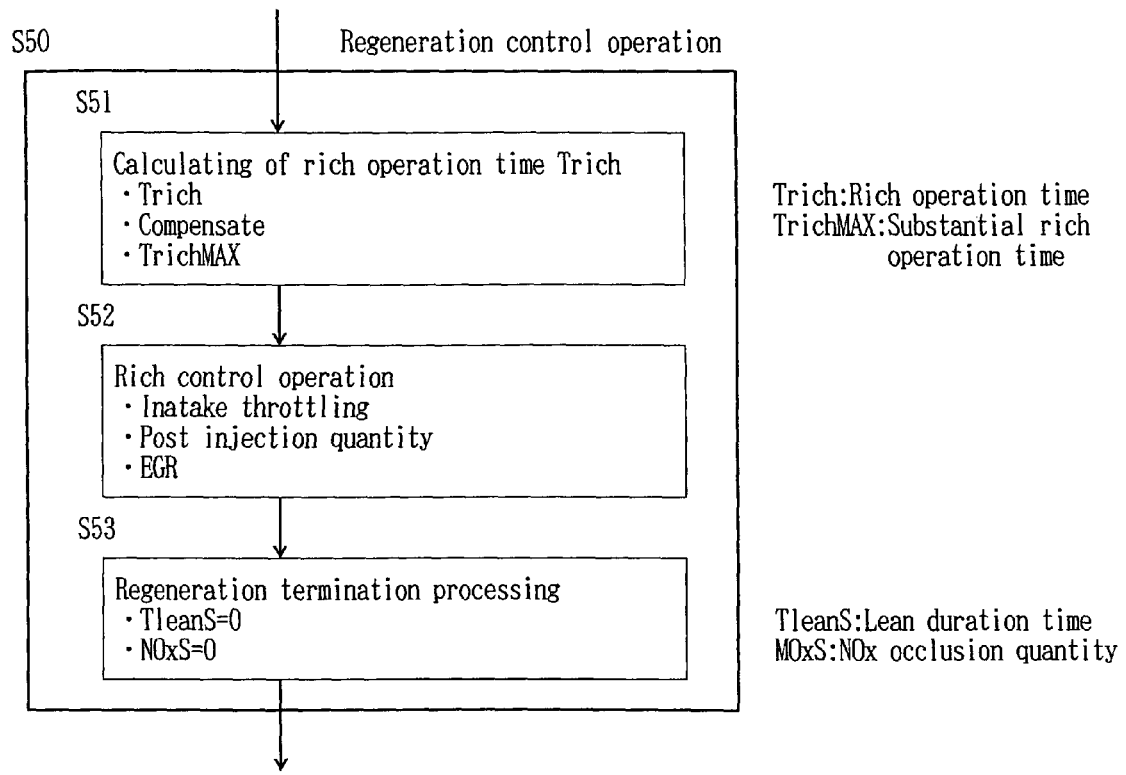
FIG. 7 is a more detailed flow chart of a regeneration control operation shown in FIG. 5.

The control method of the exhaust gas purifying system 1 is carried out according to the operation control flow as illustrated in from FIG. 5 to FIG. 7.

The operation control flow of the FIG. 5 is shown as being carried out in parallel with the other control flows of the engine during the operation of the engine 10. In this flow, if the operation of the engine is stopped with the key of the engine turned OFF, an interruption in the middle of the execution occurs, resulting the execution of this operation control flow will be suspended and terminated. The portion of the suspension and the termination of the operation control flow caused by turning the key OFF of the engine is illustrated by the dotted line.

The outline of the control flow shall be described as follows.

In the step S10, a normal lean-burn operation is carried out by the normal control operation means C10. In the step S20, the necessity of a sulfur purge control operation by the NOx occlusion reduction type catalyst 30 is judged by the sulfur purge start judgment means C20.

Then, when the sulfur purge control operation is judged to be needed in the step S20, a sulfur purge for restoring the deterioration of the catalyst due to a sulfur poisoning is carried out by the sulfur purge control operation means C40,by intermediate of the sulfur purge control operation means C40 in the step S40, before returning to the step S10.

On the other hand, when the sulfur purge control operation is judged to be unnecessary in the step S20, the necessity of a regeneration control operation for regenerating the NOx occlusion reduction type catalyst 30 is judged by the regeneration control start judgment means C30 in the step S30. In the case where the regeneration control operation is judged to be necessary in the step S30, the catalyst is regenerated by the regeneration control operation by the regeneration control operation means C50 in the step S50, before returning to the step S10. In case where the regeneration control operation is judged to be unneeded in the step S30, it returns to the step S10.

The operation control flow shown in FIG. 5 to FIG. 7 shall be described in detail as follows.

When the operation control flow starts, the NOx occlusion quantity NOxS and the sulfur accumulated quantity SOxS accumulated in the NOx occlusion reduction type catalyst 30 during the previous engine operation is read in from the memory, by the data loaded in the step S20.

Then, the normal control operation is carried out in the step S10, before proceeding to the step S20.

In the normal control operation in the step S10, the lean-burn control operation is carried out for a pre-assigned time (for instance, time corresponding to the time interval for judging whether or not to carry out the catalyst regeneration control) by a lean-burn control operation means C11 of the normal control operation means C10.

This normal control operation is a lean-burn control operation discharging an exhaust gas of the normal lean air/fuel ratio (lean-burn operation of a gasoline engine, normal combustion operation of a diesel engine) and the exhaust gas component or the exhaust temperature to be discharged turns into that of the exhaust gas of the normal diesel engine. Consequently, NOx in the exhaust gas is occluded by the NOx occlusive substance 33 because of the high oxygen concentration in the exhaust gas.

At the same time as the normal control operation, the NOx occlusion quantity NOXS occluded by the NOx occlusion reduction type catalyst 30 is calculated by an NOx occlusion quantity calculation means C12. The calculation of the NOx occlusion quantity is carried out using the NOx discharge map stored in a control apparatus in advance. This NOx discharge map expresses the relationship between the engine operation state and the NOx discharging quantity NOxS with a form of map data based on results such as preliminary measured values.

The calculation of the NOx occlusion quantity may be calculated from both measurement values of an inlet side NOx sensor and an exit side NOx sensor by installing an NOx sensor (not shown) in front and rear of the NOx occlusion reduction type catalyst 30. Otherwise, a method to evaluate how the NOx absorbing capacity gets to the saturation from both measurement values of the inlet side NOx sensor and the exit side NOx sensor is useful.

Moreover, the sulfur accumulated quantity SOxS stored in the NOx occlusion reduction type catalyst 30 is calculated by a sulfur accumulated quantity computation means C13. The calculation of the sulfur accumulated quantity SOxS is performed by calculating the sulfur deposition quantity from the fuel consumption quantity and the sulfur concentration in the fuel during the normal operation control operation for a predetermined period of time, adding the deposition quantity to the sulfur accumulated quantity SOxS so far, the calculated value is served as a new sulfur accumulated quantity SOxS, or by other ways.

In the step S20, the start period of the sulfur purge control operation is judged. The judgment is decided comprehensively from the load and the revolution condition, the exhaust temperature, the water temperature and so on, and the judgment is carried out as follows.

This determination is performed by whether the sulfur accumulated quantity SOxS reaches the sulfur storage limit value SOxMAX where the sulfur accumulated quantity SOxS becomes the saturated state as set in advance. Namely, the state which reached the sulfur storage limit value SOxMAX means such states as the NOx purifying capability deteriorates to cause troubles, if the sulfur poisoning progresses furthermore, or the frequency of the regeneration processing operation for a catalyst brings problematically low mileage. In case of the state as mentioned above, the sulfur purge shall be performed forcibly to restore the catalyst from the deterioration.

In the step S20, when it is judged to start the sulfur purge control operation, the sulfur purge control operation of the step S40 is performed, but if it is judged not to start, it goes to the step S30.

In the sulfur purge control operation of the step S40, the temperature raising control operation, the lax rich control operation, the lax lean control operation and the sulfur purge control termination processing are performed as shown in FIG. 6.

The temperature raising control operation in the step S41 is an operation to heat up the catalyst to make an optimal desulphurization environment. In this operation, the main injection is retarded and a post injection is performed during the fuel injection control together with the intake throttling. Reducers such as HC and CO are supplied into the exhaust gas by these injection controls. Then, the temperature is raised by heat generated by the oxidation reaction of these reducers reacting with catalysts or by other means. The temperature raising control is performed until the catalyst temperature reaches to the temperature higher than the temperature capable of desulphurizing. Then, it shifts to the lax rich control operation of the following step S42.

Figure 8:
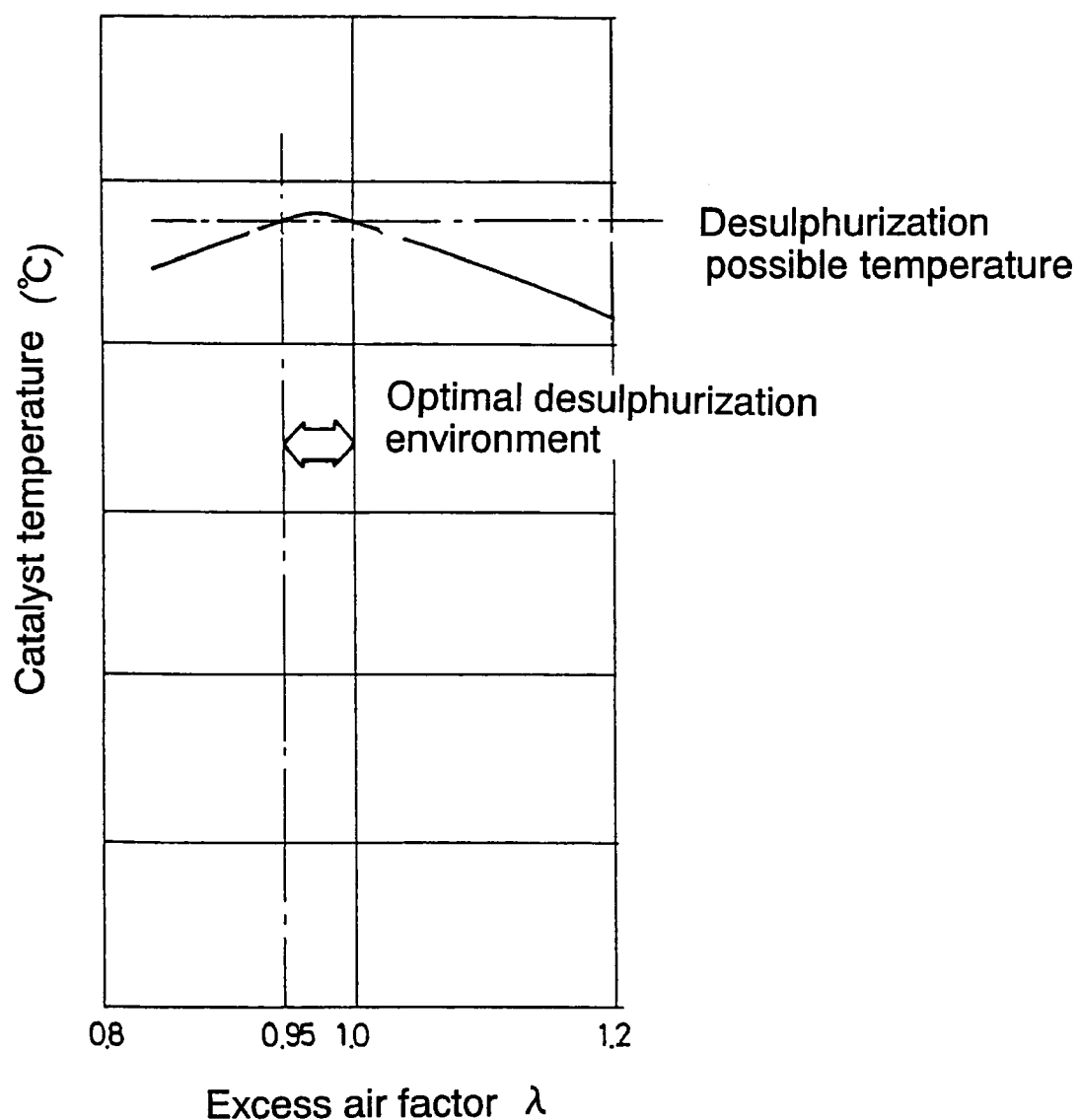
FIG. 8 shows the excess air factor λ, the catalyst temperature and the optimal desulphurization environment.

The lax rich control operation of the step S42 is a control to maintain the optimal desulphurization environment by setting the air/fuel ratio of the exhaust gas to the theoretical air/fuel ratio or slightly lower than the theoretical air/fuel ratio, performing the EGR or intake throttling together with the increase of the post injection quantity. As shown in FIG. 8, it is known from the test results that the optimal desulphurization environment can be obtained, when the excess air factor $\lambda$ in the downstream side of the catalyst is control to stay at a range where a three-way-catalyst functions. Therefore, the excess air factor $\lambda$, in particular, is controlled at the range 0.95 to 1.0.

In the sulfur purge, if the excess air factor $\lambda$ is set below 0.95 to be deep rich, the oxygen concentration decreases substantially to zero. As a result, oxygen required for the oxidation reaction of reducers becomes insufficient, and the quantity of oxidation of HC and CO decreases. The diminution of heat generated by this oxidation reaction lowers catalyst temperature to the point where the sulfur purge can not be performed satisfactorily, and results in the reducers to be discharged into the open air without being used.

On the contrary, if the intake quantity increases to raise the excess air factor $\lambda$ to 1.0 or higher, the exhaust gas temperature lowers and, at the same time, heat quantity of the catalyst taken out by the increased exhaust gas increases. Then the catalyst is cooled. Consequently, it is unable to execute the sulfur purge satisfactorily because of the lowered catalyst temperature.

In this lax rich control operation, the air/fuel ratio in the exhaust gas is set to the range of three-way-catalyst functions, by performing the intake quantity restriction by the valve throttling and the adjustment of the EGR quantity, together with the supply of a large quantity of reducers such as HC and CO required for the temperature raising by EGR and post-injection. Then, the large part of the catalyst is brought into a rich atmosphere by supplying such quantity of oxygen that can be consumed out by the oxidation reaction of these reduces, and the sulfur is separated in an optimal desulphurization atmosphere of a high temperature rich.

This lax rich control operation for a sulfur purge is sustained until the time of period calculated beforehand for the lax rich operation passes and the desulphurization is performed satisfactorily. The lax rich operation time is calculated based on the sulfur accumulated quantity calculated beforehand and the desulfurized quantity per unit time which is obtained by collating the exhaust gas quantity and the exhaust temperature at the beginning of the sulfur purge operation with the desulfurized quantity map data preliminarily input.

However, if the catalyst temperature exceeds the upper limit value where the catalyst deterioration appears, or the engine load gets out of a range where the smokeless rich operation is possible, or the catalyst temperature lowers to be under a range where the desulphurization is possible, the lax lean control operation of the step S42 is suspended and the sulfur purge control termination processing of the step S43 are performed.

In place of terminating the operation by the time of the calculated lax rich operation period, calculating the quantity of the sulfur discharge through the sulfur purge by collating the exhaust gas quantity and the exhaust temperature with the sulfur discharge map data preliminarily input, and subtracting from the sulfur accumulated quantity SOxS until it becomes below zero, the sulfur purge operation control may be repeated.

Then, if the lax rich control operation for sulfur purge of the step S42 is terminated, it goes to the sulfur purge control termination processing of the step S43.

In the sulfur purge control termination processing of the step S43, the lean duration time TleanS, the sulfur accumulated quantity SOxS and the like are reset, before returning to the step S10.

Then, in case where it is judged that the sulfur purge control is unnecessary in the step S20, it proceeds to the step S30, to judge whether the regeneration control is necessary or not. This judgment depends on whether or not the NOx occluded quantity NOxS has attained the NOx occlusion limit value NOxMAX set preliminarily, or, whether or not the time (lean duration time) TleasS of the normal control operation has attained the lean operation limit time TleanMAX.

In case where it is judged that the regeneration control operation is unnecessary in the step S30, it returns to the step S10. In case where it is judged that the regeneration control operation is necessary, it proceeds to the regeneration control operation of the step S50.

In the regeneration control operation in the step S50, the calculation of rich operation time, a rich control operation and a rich regeneration termination processing are performed.

In the calculation of rich operation time of step S51, the rich operation time Trich is calculated from the NOx occluded quantity NOxS, engine speed and load during the rich control operation. In case where the engine is in an acceleration state, the compensation is made to multiply the rich operation time Trich by the rich frequency factor calculated from the catalyst temperature and the engine speed. Moreover, a substantial rich operation time TrichMAX is given by calculating the early start time and the termination delay time of the rich control operation considering the driving of an EGR valve 42 and a throttle butterfly 23.

In the rich control operation of the step S52, the opening of the EGR valve 42, the opening of the throttle butterfly 23, the fuel injection quantity, the fuel injection timing, the fuel injection pattern and the like are adjusted and controlled by referring to the map data and feeding back the output value of a $\lambda$ sensor 52 to maintain the catalyst temperature within a predetermined temperature range in which the catalyst is active, and what is more, the excess air factor λ is controlled to maintain a rich state (rich-burn state) of 0.8 to 0.95 at the catalyst inlet.

Then, if an exhaust gas of the rich state in which the oxygen concentration is zero and HC and CO concentrations are low, flows in the NOx occlusion reduction type catalyst 30, the occluded $NO_2$ is discharged from the catalyst 30 of a high temperature to regenerate the catalyst 30. At the same time, the discharged $NO_2$ is reduced by HC and CO in the exhaust gas to be purified, producing $N_2$, $H_2O$ and $CO_2$. Moreover, HC and CO in the exhaust gas are also consumed as reducer of $NO_2$, and not discharged outside.

This rich control operation proceeds with counting the operation time TrichS and terminates when the operation time TrichS exceeds the rich operation time TrichMAX calculated in the step S51. In the regeneration termination processing of the following step S53, the data such as the NOx occluded quantity NOxS, the lean operation duration time TleanS, the rich operation duration time TrichS are reset to be zeros.

The regeneration control operation of the step S50 is performed by the series operations of steps from S51 to S53 and it returns to the step S10.

Then, the steps of the control flow from S10 to S50 are repeated until the engine key is turned OFF, and it proceeds to the control flow termination processing of the step S60 by an interruption of a termination command such as engine key OFF. In the control flow termination processing, the data such as NOx occluded quantity NOxS and the sulfur accumulated quantity SOxS accumulated in the NOx occlusion reduction type catalyst 30 and the lean operation duration time TleanS in the current engine operation are written in a memory. Thereafter, the control flow is suspended (STOP) and terminated (END).

According to the control method for the exhaust gas purifying system 1 composed as described above, when the sulfur purge is necessary, the exhaust temperature is increased to heat the catalyst temperature up equal or superior to the sulfur purge temperature by performing the temperature raise operation, namely the intake restriction for example. At the same time, a lax rich condition is obtained, more specifically, the excess air factor λ is set to a range of 0.95 to 1.0 by the rich control operation. By the exhaust temperature raising operation and by the lax rich condition, the state of the optimal temperature and low oxygen concentration for the sulfur purge is obtained. The sulfur purge can be performed efficiently while preventing the catalyst temperature from lowering.

What is claimed is:

1. A control method for an exhaust gas purifying system in which a NOx occlusion reduction type catalyst, including a catalytic metal and an NOx occluding substance, is installed in an exhaust passage of an engine, comprising:
   executing a restore processing against a sulfur poisoning of said NOx occlusion reduction type catalyst, by performing a lax rich control for controlling an air/fuel ratio of the exhaust gas to a theoretical air/fuel ratio or to a value slightly lower than the theoretical air/fuel ratio, when said NOx occlusion reduction type catalyst is heated to a sulfur purge temperature or above;
   setting an excess air factor of the exhaust gas of 0.95 to 1.0; and
   performing regeneration of the NOx occlusion reduction type catalyst when the excess air factor of 0.8 to 0.95 is maintained at the catalyst inlet.

2. A control method for an exhaust gas purifying system installed in an exhaust gas passage of an engine and having a NOx occlusion reduction type catalyst including a catalyst metal and a NOx occluding substance, comprising:
   performing a lax rich control when the NOx occlusion reduction type catalyst is heated to a sulfur purge temperature or above, to control an air/fuel ratio of exhaust gas to a value equal to or slightly lower than a theoretical air/fuel ratio, wherein the lax rich control brings the an excess air factor of the exhaust gas to 0.95 to 1.0; and
   restoring the NOx occlusion reduction type catalyst from a sulfur poisoning, wherein a regeneration control is performed for restoring NOx occlusion capacity of the NOx occlusion reduction type catalyst to bring the excess air factor of the exhaust gas to 0.8 to 0.95 at an inlet of the NOx occlusion reduction type catalyst.

* * * * *